Aug. 27, 1963 W. A. RAY 3,101,740
BALL VALVE STRUCTURE
Filed July 19, 1960 2 Sheets-Sheet 1
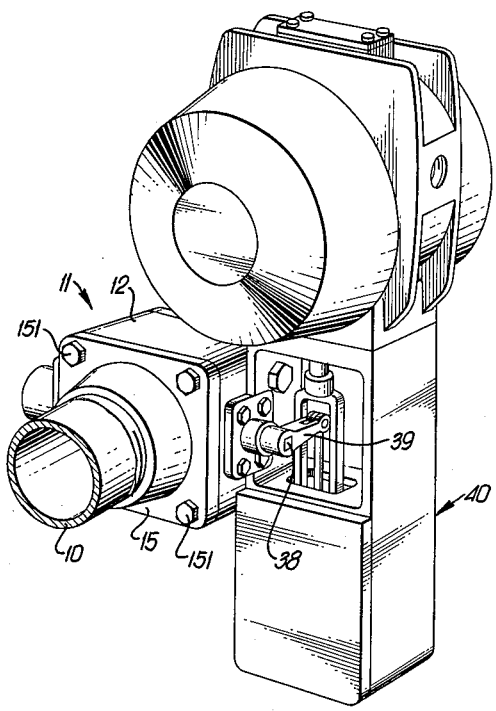
FIG. 1.
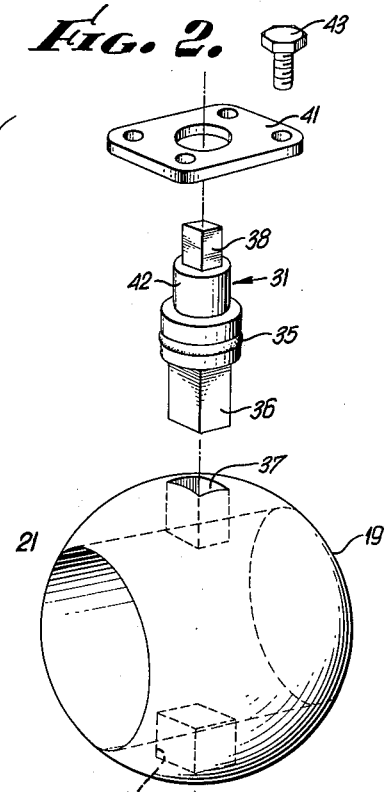
FIG. 2.
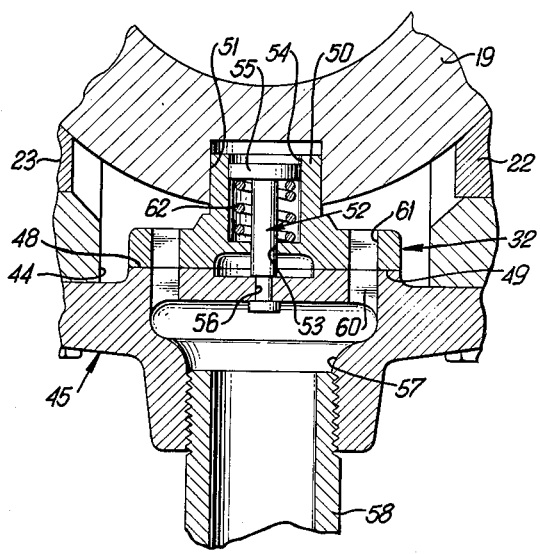
FIG. 5.
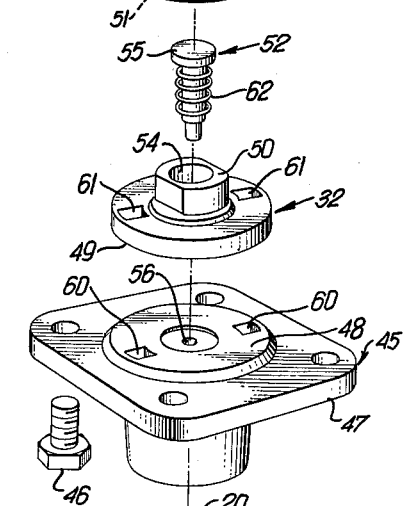
INVENTOR.
WILLIAM A. RAY
BY
Flam and Flam
ATTORNEYS.

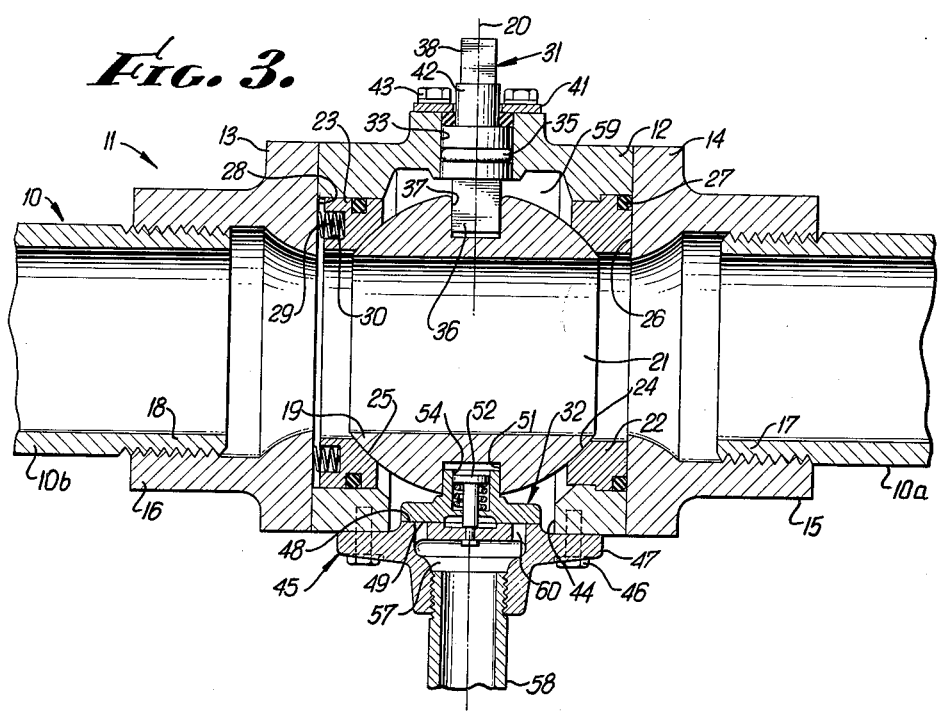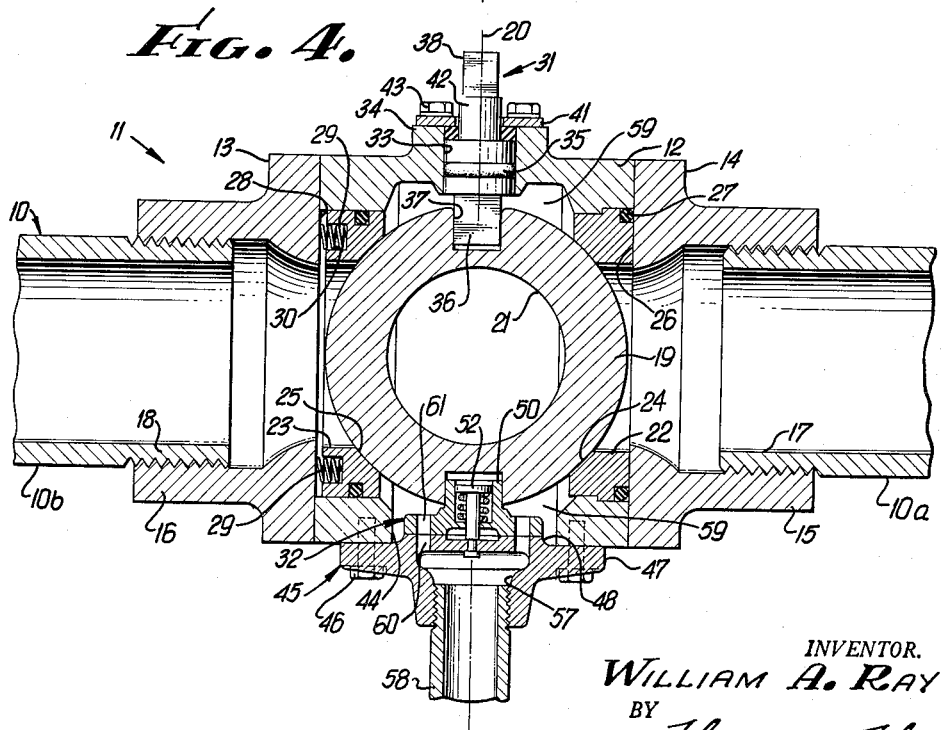

United States Patent Office 3,101,740
Patented Aug. 27, 1963

3,101,740
BALL VALVE STRUCTURE
William A. Ray, North Hollywood, Calif., assignor to General Controls Co., a corporation of California
Filed July 19, 1960, Ser. No. 43,962
1 Claim. (Cl. 137—596)

This invention relates to valves for controlling the supply of fuel to boilers, furnaces or the like.

Many modern boilers and furnaces rely upon fans to induce drafts. When shut down, such boilers or furnaces will accumulate any escaping fuel to the point of possible explosion, whereas furnaces or boilers with natural draft present a less serious hazard. Accordingly, it is an object of this invention to provide an improved shutoff valve structure that prevents any flow of fuel to a furnace when shut down.

While it has been possible to provide leak-free valves of certain types, it has never been possible consistently to provide leak-free valves of the type utilizing metal seals. Thus, valves utilizing metal seals must be used in applications where the seals must be maintained under excessive temperature conditions or during fires. Valves utilizing metal seals might leak for any number of reasons. Objects, such as nails, wire, grit, sand, scale, thread chips, can cause the metal surfaces to be scratched enough to result in leakage. No previously known technique could preclude leakage.

Accordingly, the primary object of this invention is to provide a leak-free shutoff valve, or the like, of the type utilizing metal seals. To accomplish this objective, use is made of a valve having two ports opening into a body cavity and that are both sealed by a closure located in the cavity. A ball or plug valve typifies this arrangement, although many others would fall into this general class. In such a double-ported valve, the cavity in which the closure is accommodated is opened to atmosphere when the valve is closed, but sealed when the valve is opened. This arrangement accomplishes two things. First, any leakage past the first seal is exhausted and thus bypassed from the boiler or furnace. Second, the exhausted cavity eliminates any pressure head that would tend to move fuel past the second seal if in fact it were subject to leakage.

Another object of this invention is to provide a simple, reliable mechanism for venting the closure cavity automatically and in response to movement of the closure to closed position.

Another object of this invention is to provide a vent structure of this character that conveniently utilizes the movement of the valve closure itself as a means for its actuation.

Another object of this inventioin is to provide a simplified vent structure of the foregoing characteristics, which is efficiently and economically incorporated in a bearing structure for a rotary valve closure.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claim.

Referring to the drawings:

FIGURE 1 is an isometric view of an actuator-ball valve combination, by way of example, that may incorporate the present invention;

FIG. 2 is an exploded view showing pictorially the moving parts of the improved valve structure;

FIGS. 3 and 4 are longitudinal sectional views through the valve structure and illustrating opposite positions of the valve structure; and FIG. 5 is an enlarged fragmentary sectional view corresponding to a portion of the apparatus of FIG. 4.

In FIG. 1, there is illustrated a conduit 10 in which, by way of example, a ball valve structure 11 is interposed.

The ball valve structure includes an open-ended body structure 12 that, in this example, is generally cubical. Adapter plates 13 and 14 seal opposite ends of the body, mount or cooperate with sealing rings, and provide suitable fittings for connection to the conduit parts.

The adapters 13 and 14 have corners secured to the ends of the body 12 by cap screws 151 (FIG. 1). The adapters have interiorly threaded extensions 15 and 16 for receiving the threaded ends 17 and 18 of the conduit parts 10a and 10b.

The inner ends of the adapters 15 and 16, as shown in FIG. 3, communicate with each other via the hollow interior of the body 12. The communication, however, is controlled by a ball closure 19 located within the cavity provided by the body 12. The ball closure 19 has a through passage or port 21, shown in FIG. 3, in registry with the openings in adapters 15 and 16 so that flow through the valve is uninterrupted. Two metal seal rings 22 and 23 are provided at the outlet and inlet sides of the valve body 12 that, in the open position of the valve, confine fluid for through flow. The seal rings 22 and 23 have spherical zone surfaces at 24 and 25 that encompass the ends of the port or passage 21 and engage the spherical surface of the closure 19.

The seal ring 22 is accommodated between the ball closure 19 and an otherwise exposed portion of the inner surface 26 of the adapter that extends about the adapter opening. An O-ring 27, accommodated in a corner groove of the ring 22, seals both the ring and the adapter 13 to the opening of the body 12.

The seal ring 23 is correspondingly accommodated in a space between the inner surface 28 of the inlet adapter 13 and the periphery of the ball closure 19. A series of compression springs 29, accommodated in recesses 30 annularly arrayed about the seal ring 23, react against the surface 28 to urge the seal ring 23 firmly into engagement with the ball closure 19.

The ball closure 19 is mounted for movement angularly about an axis 20 that is perpendicular to the axis of the passage 21 so that the ends of the passage move orbitally out of registry with the seal rings 22 and 23 and the adapters, corresponding to closed position of the valve. Thus, as shown in FIG. 4, the closure 19 has moved approximately 90° from the open position of FIG. 3, and the seal rings 22 and 23 now engage the closure 19 beyond the passage ends. A seal accordingly is established. The seal rings 22 and 23, of course, confine the ball closure to universal movement about axes passing through the center of the closure 19. But the closure 19 is confined for movement about the single axis 20 by a valve stem 31 and a pivoted valve plate 32 respectively at the top and bottom of the closure.

The stem 31 projects through and is journalled in a through cylindrical bore 33 formed in the top of the body 12. An embossment 34 at this portion of the body effectively lengthens the bore 33. The bore 33 has as its axis the axis 20. The medial portion of the stem 31 fits the bore 33, and O-ring 35 accommodated in a peripheral groove of this medial portion seals the body.

The inner end of the stem 31 is non-circularly formed, as at 36 (see also FIG. 2), for engagement with a corresponding non-circularly formed recess 37 at one side of the ball closure 19. The opposite end 38 of the stem 31 is accessible outwardly of the body for engagement with a lever or crank 39 (see FIG. 1), in turn affected by a suitable actuator structure 40.

To hold the stem 31 in place, an apertured retainer plate 41 is provided. The plate 41 fits over a reduced circular portion 42 of the stem 31 that inwardly adjoins the end 38. Cap screws 43 affix the plate to the end surface of the boss 34.

The stem 31 is confined for movement about the axis 20. Hence, the closure 19 is also so confined by virtue of the coupling of the parts.

To support the closure 19 opposite the stem 31, a bearing is provided. Thus, a bearing bracket 45 is clamped over an aperture 44 located on that portion of the body 12 opposite the embossment 34. Cap screws 46 for this purpose pass through apertures in a flange 47 of the bracket 45. The bracket 45, as shown most clearly in FIGS. 2 and 5, has at its inner side a raised circular land 48 that projects slightly into the body aperture 44. The land surface forms a seat engaged by the lower surface 49 of the valve plate 32. The valve plate 32, in turn, carries on its upper side a non-circular projection 50 that fits a corresponding non-circular recess 51 of the closure 19.

The valve plate 32 is confined for rotation about the axis 20 by the aid of a post or pin 52. The post 52 projects upwardly from the center of the land 48 and through an aperture 53 in the bottom of an upwardly opening recess 54 formed in the projection 50. The upper end of the post 52, which is yet within the recess 54, has an enlarged head 55 that fits the recess 54. The lower end of the post is riveted at an aperture 56. The aperture 56 extends into the upper enlarged portion of a downwardly opening recess 57 of the bracket 45.

The recess 57 of the bracket 45 communicates with a venting conduit 58. The valve plate 32 places the body cavity housing the closure 19 into communication with the vent 58 upon movement of the ball closure 19 to the closed position of FIG. 4, but seals the space 59 from the vent 58 when the ball closure is in the open position of FIG. 3.

For this purpose, the valve plate 32 covers and uncovers diametrically disposed vent ports 60 that extend inwardly from the seat 48 to the vent recess 57. The valve plate 32 has corresponding apertures 61 that register with the vent ports 60 only when the ball closure is moved to closed position. The diametric arrangement of vent ports ensures operation irrespective of the direction the ball closure may be moved toward closed position.

To keep the valve plate 32 firmly against the seat 48, a spring 62 is interposed in the space between the post head 55 and the bottom of the recess 54. The spring 62 holds the valve plate 32 seated whatever may be the position of the ball closure along the axis 20.

The upper side of the valve plate is exposed in the space or chamber 59. Hence, this space is immediately vented upon closure of the valve.

Should the seal at the ring 23 leak, fluid passing the ring and flowing into the cavity 59 will be conducted to the vent 58. Should the seal at the ring 22 leak, there will be no pressure in the cavity 59 tending to move fluid into the conduit 10a.

The inventor claims:

In a ball valve combination: a hollow body having openings at both ends forming an inlet and an outlet; said body also having a lateral opening between its ends; a ball closure in the body and having a through passage registrable with said end body openings; metal seals for closing both the inlet and the outlet when the closure is in closed position; said seals defining a cavity in said body isolated from the inlet and the outlet when the valve is in closed position; a bracket affixed at said lateral opening and having a flat valve seat exposed in the body; there being a port surrounded by the seat; said bracket having passage means placing the port in communication with a vent; a valve plate having a surface engaging the seat; said valve plate and said ball closure having non-circular parts located at the axis of the ball and providing an axially movable coupling therebetween; means confining the valve plate and the ball closure for movement about an axis transverse to the ball closure passage; the valve plate uncovering said port when the ball closure is in closed position and covering said port when said ball closure is moved away from closed position; said valve plate having a non-circular projection of uniform cross-section fitting within a corresponding non-circular recess of said ball closure to establish said coupling; said valve plate having a recess extending inwardly from the end of said projection and provided with an aperture in the bottom thereof; said bracket having a post extending upwardly from said seat and into said projection recess via said aperture; said post having an enlarged head guidingly accommodated in the projection recess; and a compression spring in said projection recess engaging said head and the bottom of said recess for maintaining the valve plate in engagement with the seat independently of the adjusted position of said ball valve along said axis.

References Cited in the file of this patent

UNITED STATES PATENTS

| | | |
|---|---|---|
| 621,928 | Libbey | Mar. 28, 1899 |
| 1,616,386 | O'Stroske | Feb. 1, 1927 |
| 1,977,592 | Reure | Oct. 16, 1934 |
| 2,877,979 | Snyder | Mar. 17, 1959 |
| 2,973,182 | Gill | Feb. 28, 1961 |

FOREIGN PATENTS

| | | |
|---|---|---|
| 36,506 | Germany | of 1886 |
| 340,683 | Switzerland | Oct. 15, 1959 |
| 468,991 | Great Britain | July 16, 1937 |
| 622,149 | Great Britain | Apr. 27, 1949 |